(12) United States Patent
Ryman

(10) Patent No.: US 11,953,136 B2
(45) Date of Patent: Apr. 9, 2024

(54) QUICK CONNECTOR

(71) Applicant: Oetiker Schweiz AG, Horgen (CH)

(72) Inventor: Morgan Ryman, Anderstorp (SE)

(73) Assignee: Oetiker Schweiz AG, Horgen (CH)

(*) Notice: Subject to any disclaimer, the term of this patent is extended or adjusted under 35 U.S.C. 154(b) by 113 days.

(21) Appl. No.: 17/767,485

(22) PCT Filed: Oct. 10, 2019

(86) PCT No.: PCT/EP2019/074316
§ 371 (c)(1),
(2) Date: Apr. 8, 2022

(87) PCT Pub. No.: WO2021/069047
PCT Pub. Date: Apr. 15, 2021

(65) Prior Publication Data
US 2023/0100312 A1    Mar. 30, 2023

(51) Int. Cl.
*F16L 37/088* (2006.01)
*F16L 37/098* (2006.01)

(52) U.S. Cl.
CPC ......... *F16L 37/0985* (2013.01); *F16L 37/088* (2013.01)

(58) Field of Classification Search
CPC ... F16L 37/0985; F16L 37/088; F16L 37/144; F16L 33/22
See application file for complete search history.

(56) References Cited

U.S. PATENT DOCUMENTS

| | | | |
|---|---|---|---|
| 2,521,127 A * | 9/1950 | Price | F16L 37/088 |
| | | | 285/302 |
| 4,538,679 A | 9/1985 | Hoskins et al. | |
| 4,645,245 A * | 2/1987 | Cunningham | F16L 37/088 |
| | | | 285/353 |
| 2004/0093708 A1 | 5/2004 | Malone | |
| 2021/0221222 A1* | 7/2021 | Steinmann | F16L 37/088 |
| 2023/0097783 A1* | 3/2023 | Ryman | F16L 37/0985 |
| | | | 285/18 |

FOREIGN PATENT DOCUMENTS

| | | | |
|---|---|---|---|
| DE | 3341029 A1 | 5/1985 | |
| EP | 3097335 A1 | 11/2016 | |
| WO | WO-03029716 A1 * | 4/2003 | ........... F16L 37/008 |

OTHER PUBLICATIONS

International Application No. PCT/EP2019/074316, International Search Report and Written Opinion dated May 18, 2020, 13 pages.

* cited by examiner

*Primary Examiner* — Matthew Troutman
*Assistant Examiner* — James A Linford
(74) *Attorney, Agent, or Firm* — David L. Nocilly; Bond Schoeneck & King PLLC

(57) ABSTRACT

A quick connector for establishing a snapping connection between a tubular male part (50) and a female part (40) of a fluid connection system. The connector has a retainer (10) adapted to be set within the mouth portion (41) of the female part (40) and having a resilient member (20) for snapping engagement with both a thickened portion (52) of the male part (50) and an annular groove (42) in the mouth portion (41) of the female part (40) when the resilient member (20), which is held by the a retainer (10) in an axially fixed position, is stretched in the radial direction due to the snapping engagement with the male part (50).

10 Claims, 4 Drawing Sheets

Figure 1:
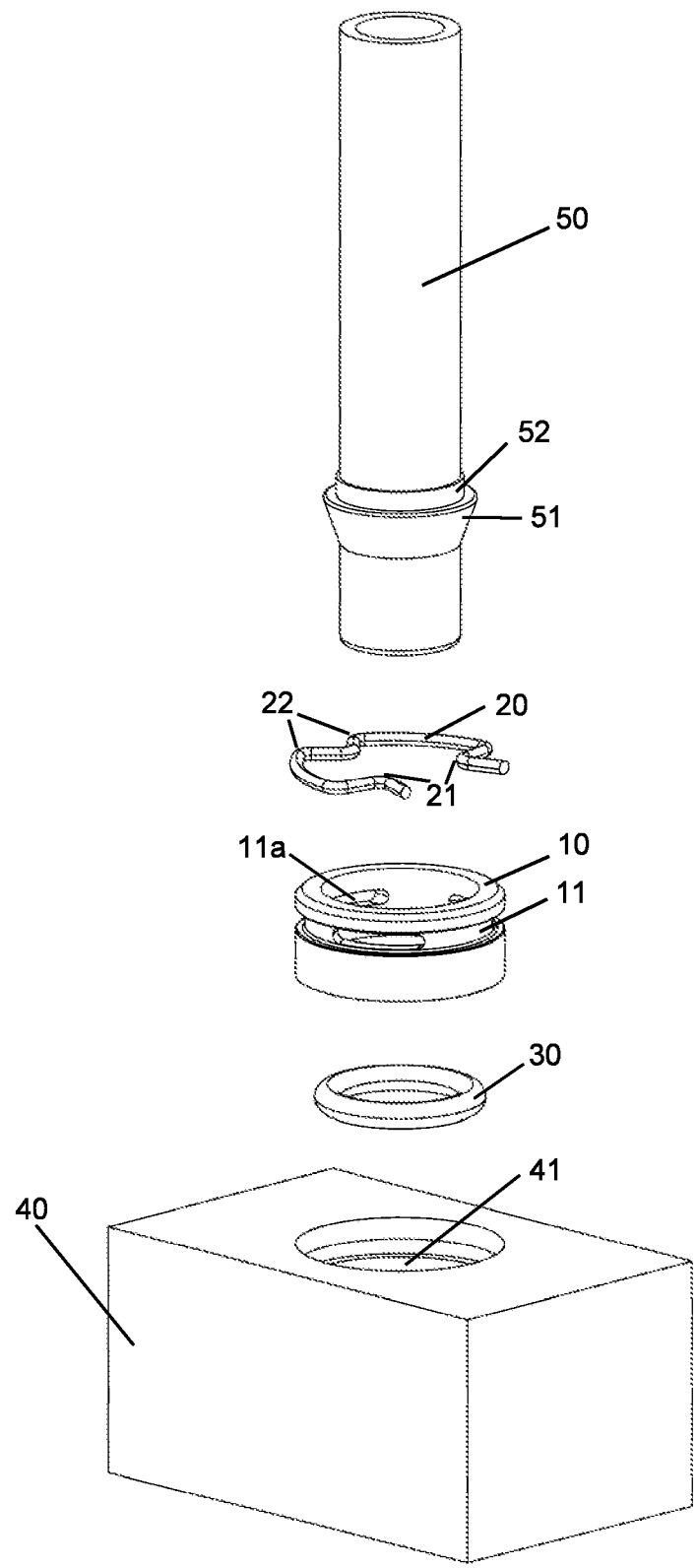

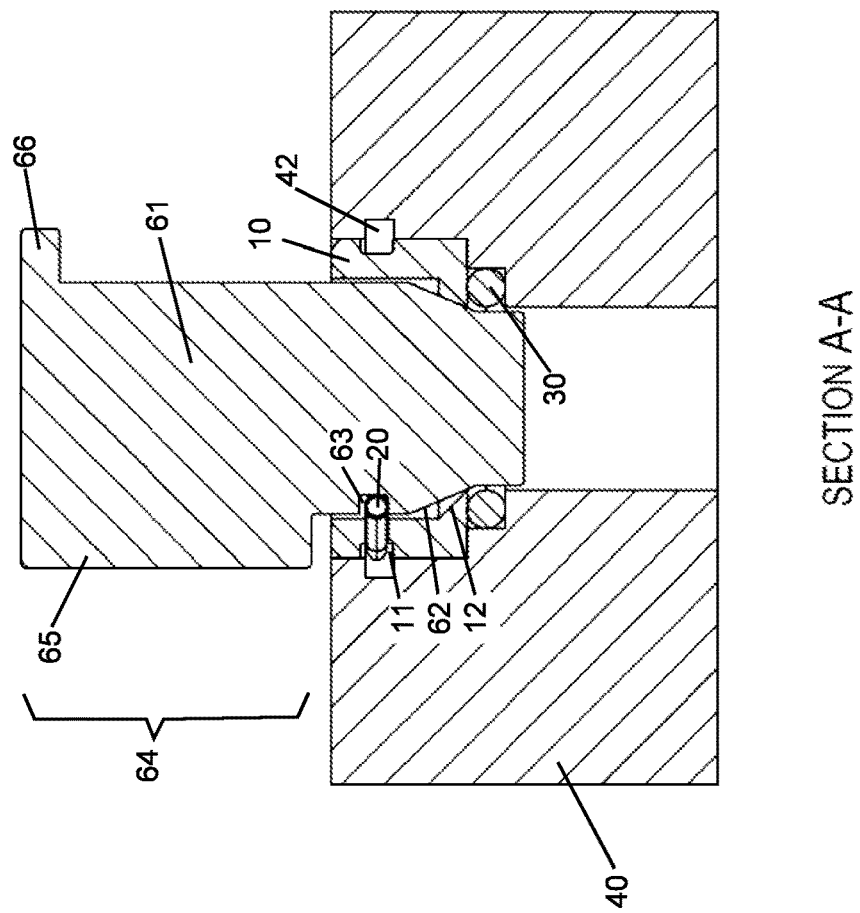
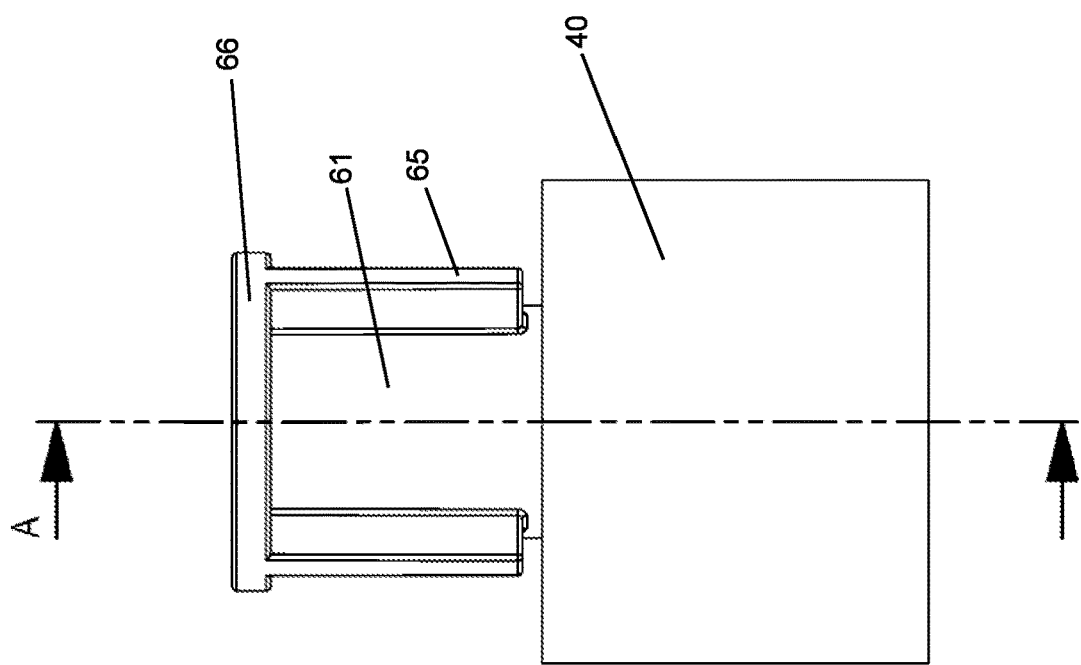

QUICK CONNECTOR

BACKGROUND OF THE INVENTION

Quick connectors or snap connectors are widely used for allowing easy connection between a male part, such as a pipe socket, spigot or nipple, and a female part, particularly a hole portion in a block part of a fluid conducting system. Traditionally, the connector has a threaded portion to be screwed into the female part and a sleeve portion which extends from the female part after the threaded portion has been screwed thereinto and which has a resilient member in form of a yoke spring which exerts a spring force in the radial direction for snapping engagement with a recessed portion of the male part.

A disadvantage of the traditional connector is its relatively long axial extension and the existence of two potential leakage positions. There is a first leakage position at the threaded portion where a first O-ring forms a seal between the connector and the female part and a second leakage position within the inner periphery of the sleeve portion where a second O-ring forms a seal between the connector and the male part.

US 2015/0145240 A1 describes a quick connector in which the threaded part is eliminated, and the connector is not screwed but clinched or staked or swaged in a non-removable fashion to the female part. While this conventional solution eliminates the need of the first O-ring to form a seal between the connector and the female part, it suffers from the disadvantage that the quick connector is permanently connected to the female part. Also, the quick connector still protrudes from the outer surface of the female part when being permanently connected thereto which is undesirable for space saving connector solutions, particularly in fields like battery cooling required in automotive systems for e-mobility.

BRIEF SUMMARY OF THE INVENTION

The object of the present invention is to simplify the constructional setup of the connector, to shorten its axial extension and to reduce the number of potential leakage positions.

The object is met by the connector defined in present claim 1. The dependent claims relate to preferred embodiments and additionally call for a connection system comprising the connector and the male and female parts to be connected with each other.

The connector of the present invention has no threaded portion for screw connection between the female part and the connector. Instead, the resilient member is adapted to have a double function so that it does not only provide a snapping engagement function with the male part but also allows engagement with the female part when being stretched in the radial plane transversal to the axial direction due to the snapping engagement with the male part.

In a particular embodiment of the present invention, the quick connector has a retaining means having an annular recess formed on its outer circumference in which the resilient member, preferably a yoke spring, is held in an axially fixed position. The annular recess has radial openings through which at least one first portion of the resilient member protrudes radially inwards. When the resilient member is stretched in the radial direction by the snapping engagement with the male part, at least one second portion of the resilient member extends beyond the outer diameter of the retaining means so that it engages with corresponding portion at the inner diameter of the female part to lock the retaining means in its connected condition.

More precisely, the size and shape of the resilient member is designed such that, before inserting the male part, it is already in a pre-locked state when inserted into the female part, e.g. for keeping it from falling out during transport. In this pre-locked engagement position, the at least one second portion of the resilient member protrudes far enough into the corresponding portion at the inner diameter of the female part, e.g. an annular groove, to keep the retaining means attached to the female part. It is then to be fully engaged and blocked in a locking engagement position when the male part is inserted.

The sealing means, preferably an O-ring, an X-seal or a lip seal, is positioned axially frontwards of the retaining means within the mouth portion of the female part. The sealing position does not axially overlap with the retaining means so that the sealing means is able to contact both the male part and the female part when the quick connector is in its locked condition. Thereby, one single sealing position is sufficient for the coupling between the male and female parts so that there is only one single potential leakage position.

The present invention preferably further comprises a plug for holding the retaining means and the sealing means in their non-installed condition. The retaining means and the sealing means are received at a shaft portion of the plug which has a smaller outer diameter than a gripping portion thereof. The plug serves as a place holder for the male part and is useful in quick and safe handling of the connector during the manufacturing and delivering of the connector, as well as during its later assembling in the fluid connection system, in particular in automobile industry.

The shaft portion preferably has a tapered section for gradually stretching the resilient member and/or a groove section for receiving the resilient member in its stretched state. The resilient member can thus be stretched to engage with the female part to keep the connector in its locked and sealed state until the plug is to be replaced by the male part. The groove section has a smaller diameter than the circumferentially adjacent portions of the plug and therefore allows the resilient member to contract due to its spring force in the radial direction so that it engages with both the female part and the plug. This state is useful for safe transport or for pressure tests before installation.

In order to release the plug, the plug is turned about its longitudinal axis so that the at least one first portion of the resilient member no longer engages with the groove section of the plug and the resilient member stretches even more so that the at least one second portion protrudes even more into the radial direction for engagement with the female part. In this state, the plug can be taken out from the connector kept engaged with the female part so that the plug can be replaced by the male part. In summary, the plug allows to close the mouth portion of the female part in a fully sealed condition at a second rotational position and the plug may be released at a first rotational position when the plug is to be replaced by the male part.

When the plug is replaced by the male part of the fluid connection system, preferably a spigot, the resilient member is stretched by the male part in a similar way in the radial direction as by the plug to bring the connector in its fully locked state. The female part has a groove formed on the inner periphery of its mouth portion. The groove may have an annular or any other suitable shape. It has a larger inner diameter than the axially adjacent portions of the mouth portion so that the resilient member can lock into the groove when being stretched against its spring force due to the insertion of the male part. Thereby, the resilient member provides a double functionality of providing not only a snapping connection between the retaining means and the male part or the plug, but also between the retaining means and the female part by snapping into the groove formed on the inner periphery of the female part's mouth portion.

BRIEF DESCRIPTION OF THE SEVERAL VIEWS OF THE DRAWING(S)

Figure 2:
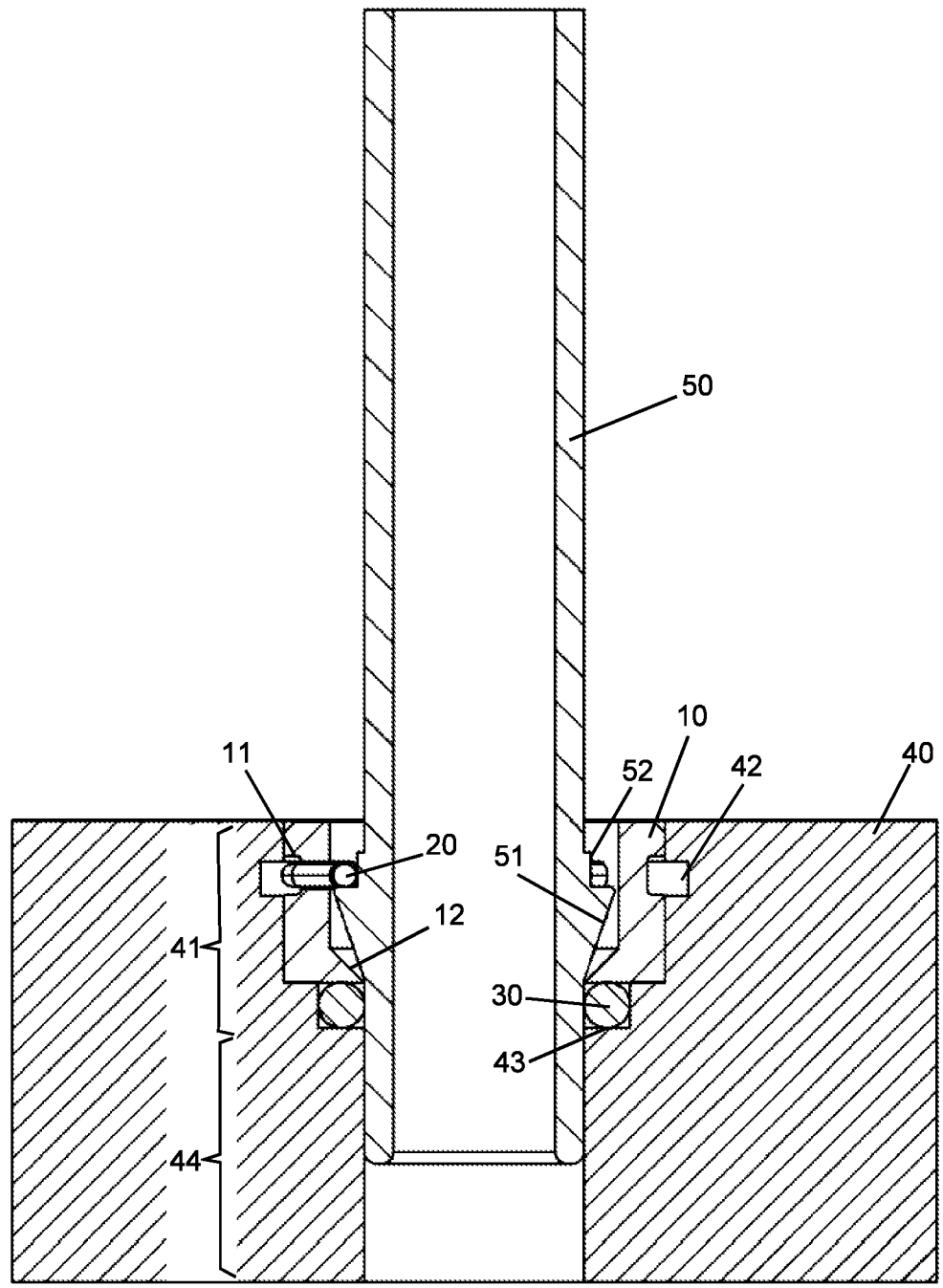
Figure 3:
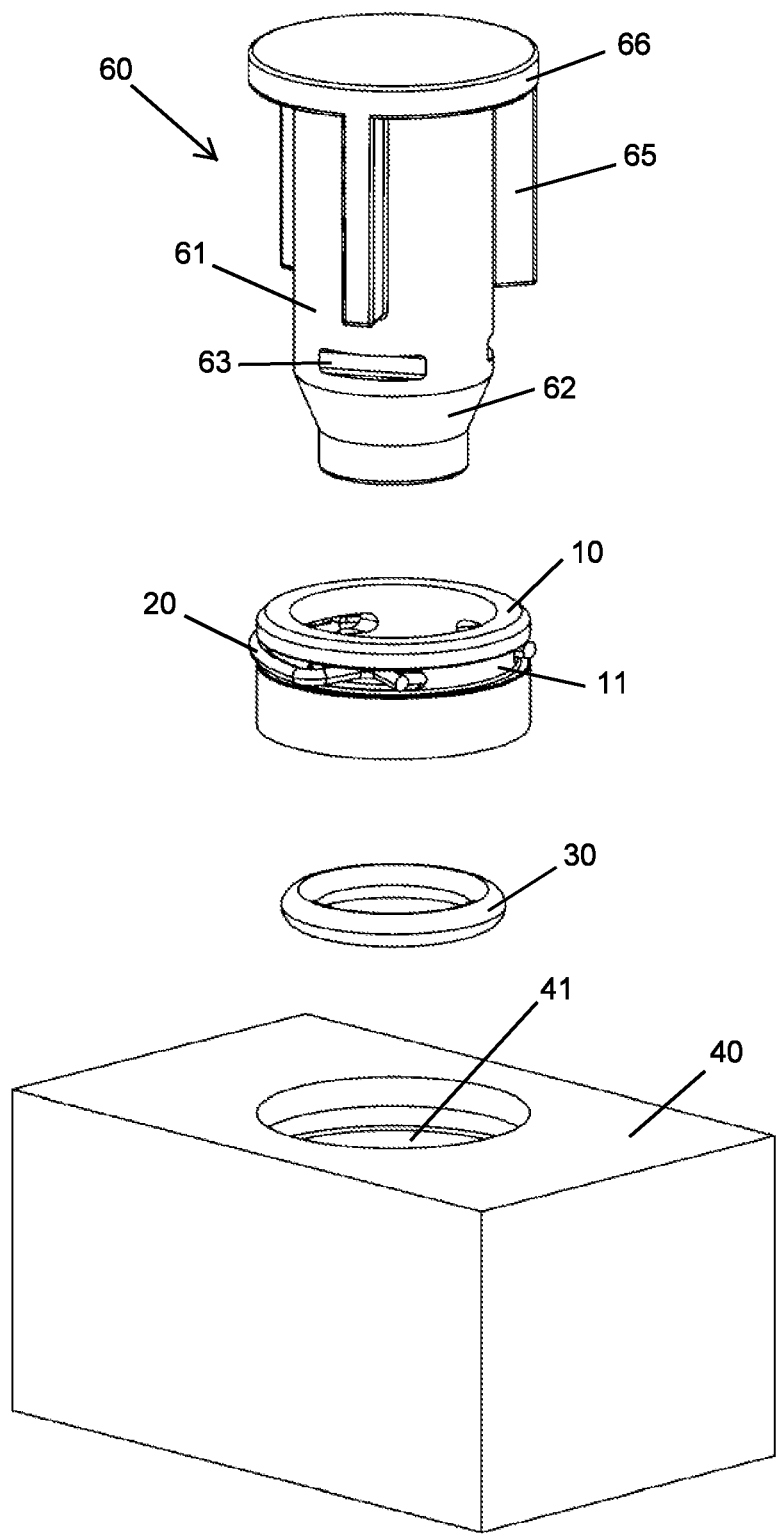

Details of the invention and its embodiments will be explained with reference to the accompanying drawings. Therein shows:

FIG. 1 a perspective view of the fluid connection system components according to an embodiment of the present invention in a non-connected state;

FIG. 2 a cross-sectional view of the fluid connection system in its fully connected state;

FIG. 3 a perspective view of the connector, the female part and the plug according to the embodiment of the present invention in a non-connected state;

FIG. 4 a side view of the plug connected to the female part by the connector according to the embodiment; and FIG. 5 a cross-sectional view along the line A-A of FIG. 4.

DETAILED DESCRIPTION OF THE INVENTION

In the perspective view of the fluid connection system shown in FIG. 1, the female part 40 is formed as a hole in a block. While conventional fluid connection systems provided an inner threading in the hole for screwing a threaded portion of the connector, the mouth portion 41 of the female part 40 is adapted to fully receive and engage with the connector without such threaded portion. FIG. 1 shows the ring-shaped retaining means 10, the resilient member 20, the sealing means 30 and the spigot 50 in an exploded view before connection to the female part 40. The inserting direction of the spigot 50 extends downwards in the Figure and is hereafter designated as the frontward direction. The opposite direction is designated as the backward direction.

An O-ring 30 as the sealing means is to be positioned at an annular step 43 (see FIG. 2) formed at the frontward end of the mouth portion 41. The O-ring 30 and the other parts of the connector, that is the retaining means 10 and the resilient member 20 are shown in FIG. 1 axially distant from the mouth portion 41, and the spigot 50 as the male part is axially spaced even more backward therefrom. In order to establish the fully connected state of the fluid connection system shown in FIG. 2, the sealing means 30 is first positioned within the mouth portion 41 at the step 43 of the female part 40 as shown in FIG. 2, the resilient member 20 is snapped into the annular recess 11 of the ring-shaped retaining means 10 and then positioned in its relaxed spring state axially backwards and adjacent to the sealing means 30. The connector already comes into a pre-locked engagement state when being inserted into the mouth portion 41. This is because the resilient member 20 will undergo some compression when entering the mouth portion 41 and the four second portions 22 thereof will then snap into the annular groove 42 of the female part 40. Thereby, the resilient member 20 and the retaining means 10 are prevented from falling out of the mouth portion 41 during transport or the like.

Finally, the male part 50 is pushed through the retaining means 10 and the sealing means 30 until the three first portions 21 of the resilient member 20 which protrude radially inwards form a snapping engagement with the male part 50. More specifically, the resilient member 20 is first stretched by a tapered portion 51 of the male part 50 and the three first portions 21 of the resilient member 20 then rest on a thickened portion 52 backwards of the tapered portion 51. Thereby, the resilient member 20 is stretched in its outer diameter so that the four second portions 22 thereof engage with an annular groove 42 of the female part 40.

This can be best understood based on FIG. 2 showing the fluid connection system in its locked state. Therein, the female part 40 is formed as a hole in a block. The hole has a standard diameter portion 44 which is slightly larger than the outer diameter of the frontward portion of the male part 50. Backwards from the standard diameter portion 44, there is the mouth portion 41 having a larger inner diameter than the standard diameter portion 44. The mouth portion 41 has the step 43 for receiving the sealing means 30 and a portion with a larger diameter than that of the step 43 in which the retaining means 10 is to be received such that it is not protruding axially outwards from the female part 40. The mouth portion 41 further has an annular groove 42 with a larger diameter than the adjacent backward part of the mouth portion 41 so that the resilient member 20 can protrude into the annular groove 42 when being stretched or spanned by the tubular male part 50 into its locked state.

The tubular male part 50 has a standard outer diameter at its most frontward portion which then gradually increases in a tapered portion 51 arranged for gradually stretching the resilient member 20 when the male part 50 is pushed through the retaining means 10. Backwards from the tapered portion 51, there is a thickened portion 52 which has an outer diameter large enough to keep the resilient member 20, more specifically, the four second portions 22 thereof, in its locked state within the annular groove 42. FIG. 2 shows the connection system in a cross-section in which the second portions 22 protrude only slightly into the annular groove 42. The level of protrusion will be greater in other sections not shown here.

The retaining means 10 has an annular recess 11 formed on its outer periphery for receiving a yoke spring 20 as the resilient member. The annular recess 11 has radial openings 11a formed as elongate through-bores which allow at least the three first portions 21 of the resilient member 20 to extend therethrough. Further, there is a funnel portion 12 frontwards from the annular recess 11 at which the inner diameter of the retaining means 10 gradually decreases below the standard outer diameter at the most frontward portion of the male part 50 to form a stopping position for the insertion of the male part 50.

In the present embodiment, the resilient member is formed as a yoke spring 20 having a curved shape with three first portions 21 for engagement with the tapered and thickened portions 51, 52 of the male part 50, and four second portions 22 for engagement with the annular groove 42 within the mouth portion 41 of the female part 40. The number of first and second portions 21, 22 may be selected arbitrarily. Also completely different designs, shapes and dimensions for the resilient member 20 are possible and encompassed by the present disclosure.

Both the retaining means 10 and the resilient member 20 are preferably formed of metal, in particular stainless steel. However, one or both of them may also be formed of a plastics material of suitable quality and flexibility, in particular some fibre-glass reinforced polymer material.

FIG. 3 shows the sealing means 30 and the retaining means 10 with the attached resilient or spring member 20 to be arranged on a plug 60 before insertion into the female part 40 of the connection system in an exploded view. It is often useful to pre-assemble the parts of the quick connector on the plug 60 in order to allow easy manufacturing and efficient processing before the final assembling steps. FIGS. 4 and 5 show the plug 60 when fully connected to the female part 40 via the connector.

As can be seen best in the cross-sectional view of FIG. 5, the shaft portion 61 of the plug 60 has a standard outer diameter coinciding with that of the male part 50 for which it serves as a place holder. Also, the tapered section 62 substantially corresponds to the tapered portion 51 of the male part 50 and serves for stretching the resilient member 20 when the plug 60 is pushed through the retaining means 10 and the sealing means 30. The resilient member 20 may be maintained in this maximum stretched state to again remove the plug 60 from the hole opening of the female part 40 in a first rotational position.

However, FIG. 5 shows the plug 60 in a second rotational position in which the resilient member 20 is relaxed into a second stretched state due to the fact that the first portions 21 of the resilient member 20 engage with groove sections 63. There are three groove sections 63 formed intermittently along the outer circumference of the shaft portion 61 so as to have coincident circumferential orientations with the three first portions 21 in the second rotational position. The outer diameter of the plug 60 at the groove sections 63 substantially coincides with that of the thickened portion 52 of the male part 50. Thereby, the resilient member 20 is allowed to relax into its second stretched state by the spring force exerting into the radial direction. The second stretched state encompasses a smaller radial dimension of the resilient member 20 compared to the first stretched state and corresponds to the state of full locking engagement. In this state there is full engagement between the second portions 22 and the annular groove 42 of the female part 40 so that the plug 60 is closing the mouth portion 41 and keeps the connector in a fully locked state which is particularly useful during transport or when doing pressure test before final installation.

The plug 60 can be rotated back into the first rotational position to be removed in the backward direction for replacement by the male part 50 in the final assembling step. The resilient member 20 then no longer remains with its first portions 21 within the groove sections 63 but the second portions 22 protrude even further into the annular groove 42 than in the locked state. After removal of the plug 60, the connector remains in its pre-locked state within the female part 40.

Summing up, there are substantially three different states of the resilient member 20: (1) The relaxed state in which it is connected to the retaining means 10 and in which its second portions 22 protrude far enough into the radial direction to snap into the groove 42 of the female part 40 to establish the pre-locking engagement. (2) The first stretched state into which the resilient member 20 is widened up by the tapered portion 51 of the male part 50 or the tapered portion 62 of the plug 60 and in which the resilient member 20 is kept when the plug 60 is in its first rotational position. (3) The second stretched state which is the state of full locking engagement and into which the resilient member 20 snaps back from the first stretched state when the male part 50 is pushed further into the forward direction so that the first portions 21 come to rest onto the thickened portion 52 or when the plug 60 is brought into the second rotational position in which the the first portions 21 engage with the grooves 63.

The plug 60 further has stopping ridges 65 extending in the axial direction and providing the plug 60 with an enlarged outer diameter for stopping abutment against the retaining means 10 when the plug 60 is in its fully inserted position. A gripping portion 64 of the plug 60 comprises the stopping ridges 65 and a disk portion 66. The stopping ridges 65 allow easy rotation of the plug 60 by a user's hand and sufficiently enlarge the diameter of the plug to prevent it from being pushed too far into the connector. They further indicate to the user at which circumferential portions of the plug 60 the groove sections 63 are formed and they extend up to a disk portion 66 forming the terminal edge of the plug 60 at the most backward portion.

The shape and the material of the resilient member 20 may be selected such that it has enough flexibility to insert the plug 60 with the connector thereon into the female part 40 until the second portions 22 lock into the annular groove 42. Thereafter, the plug 60 may be turned about its longitudinal axis from the first rotational position into the second rotational position to remove the plug 60. The connector remains within the female part 40 in the pre-locked engagement state ready for final assembly with the male part 50.

In summary, the present invention provides a quick connector for establishing a snapping connection between a tubular male part 50 and a female part 40 of a fluid connection system. The connector has retaining means 10 adapted to be set within the mouth portion 41 of the female part 40 and having a resilient member 20 for snapping engagement with both a thickened portion 52 of the male part 50 and an annular groove 42 in the mouth portion 41 of the female part 40 when the resilient member 20, which is held by the retaining means 10 in an axially fixed position, is stretched in the radial direction due to the snapping engagement with the male part 50.

| List of Reference Signs | |
|---|---|
| 10 | retaining means |
| 11 | annular recess |
| 11a | openings |
| 12 | funnel portion |
| 20 | resilient member |
| 21 | first portions |
| 22 | second portions |
| 30 | sealing means |
| 40 | female part |
| 41 | mouth portion |
| 42 | annular groove |
| 43 | step |
| 44 | standard diameter portion |
| 50 | tubular male part |
| 51 | tapered portion |
| 52 | thickened portion |
| 60 | plug |
| 61 | shaft portion |
| 62 | tapered section |
| 63 | groove section |
| 64 | gripping portion |
| 65 | stopping ridges |
| 66 | disc portion |

The invention claimed is:

1. A fluid connection system including a tubular male part (50), a female part (40) and a quick connector for connecting the tubular male part (50) to the female part (40), comprising:
   a seal (30) set within a mouth portion (41) of the female part (40) to form a seal between the male part (50) and the female part (40);

a retainer (10) set within the mouth portion (41) to hold the sealing means (30); and a resilient member (20) for snapping engagement with the male part (50), wherein the resilient member (20) is held by the retainer (10) in an axially fixed position and exerting a spring force in a radial direction transversal to an axial direction of the connector, wherein the tubular male part (50) has a tapered portion (51) in which the outer diameter gradually increases in order to stretch the resilient member (20) when the tapered portion (51) is inserted into the retainer (10), and the female part (40) has an annular groove (42) formed on the periphery of its mouth portion (41), and wherein the tubular male part (50) has a thickened portion (52) which is adapted to push the resilient member (20) radially outwards when the male part (50) is in snapping engagement with the retainer (10), so that the resilient member (20) is stretched in the radial direction and protrudes into the annular groove (42) when the male part (50) is in snapping engagement with the retainer (10).

2. The fluid connection system of claim 1, wherein the resilient member (20) is positioned and held in an annular recess (11) formed on the outer circumference of the retainer (10), and the annular recess (11) has openings (11a) through which the resilient member (20) protrudes radially inwards.

3. The fluid connection system of claim 1, wherein the resilient member (20) is a yoke spring.

4. The fluid connection system of claim 1, wherein the resilient member (20) has a curved shape, at least one first portion (21) of the resilient member (20) extends radially inwards beyond the inner diameter of the retaining means (10) to allow snapping engagement with the outer circumference of the male part (50), and at least one second portion (22) of the resilient member (20) extends radially outwards beyond the outer diameter of the retainer (10) when the resilient member (20) is stretched in the radial direction to allow a locking engagement with the inner circumference of the female part (40).

5. The fluid connection system of claim 4, wherein the at least one second portion (22) of the resilient member (20) extends beyond the outer diameter of the retainer (10) even when the resilient member (20) is in its unstretched state to allow pre-locking engagement with the inner circumference of the female part (40).

6. The fluid connection system of claim 1, wherein the retainer (10) is adapted to retain the seal (30) in a sealing position axially next to but not overlapping the retainer (10) so that the seal (30) is adapted to contact both the male part (50) and the female part (40) in a locked condition of the quick connector.

7. The fluid connection system claim 1, further comprising a plug (60) for holding the retainer (10) and the seal (30) in a non-installed condition of the connector, wherein the plug (60) has:

a shaft portion (61) adapted to extend through the retainer (10) and the seal (30); and a gripping portion (64) having a larger outer diameter than the inner diameter of the retainer (10) so that it protrudes axially outwards therefrom to be gripped by a user.

8. The quick connector of claim 7, wherein the shaft portion (61) has:

a tapered section (62) with gradually increasing outer diameter adapted to stretch the resilient member (20) when the tapered section (62) is inserted into the retainer (10) until the resilient member (20) has reached a first stretched state; and/or a groove section (63) for receiving the resilient member (20) so that it can relax from the first stretched state into a second stretched state when the plug (60) is fully inserted into the retainer (10) and the plug (60) is turned from a first rotational position into a second rotational position relative to the retainer (10).

9. The fluid connection system of claim 1, wherein the tubular male part (50) comprises a spigot, and the female part (40) is a hole in a connector block.

10. The system of claim 9, wherein the mouth portion (41) has a larger inner diameter than an axially adjacent portion (44) of the female part (40), and the mouth portion (41) has a step (43) for receiving the seal (30).

* * * * *